INVENTOR
STEPHEN C. BAER

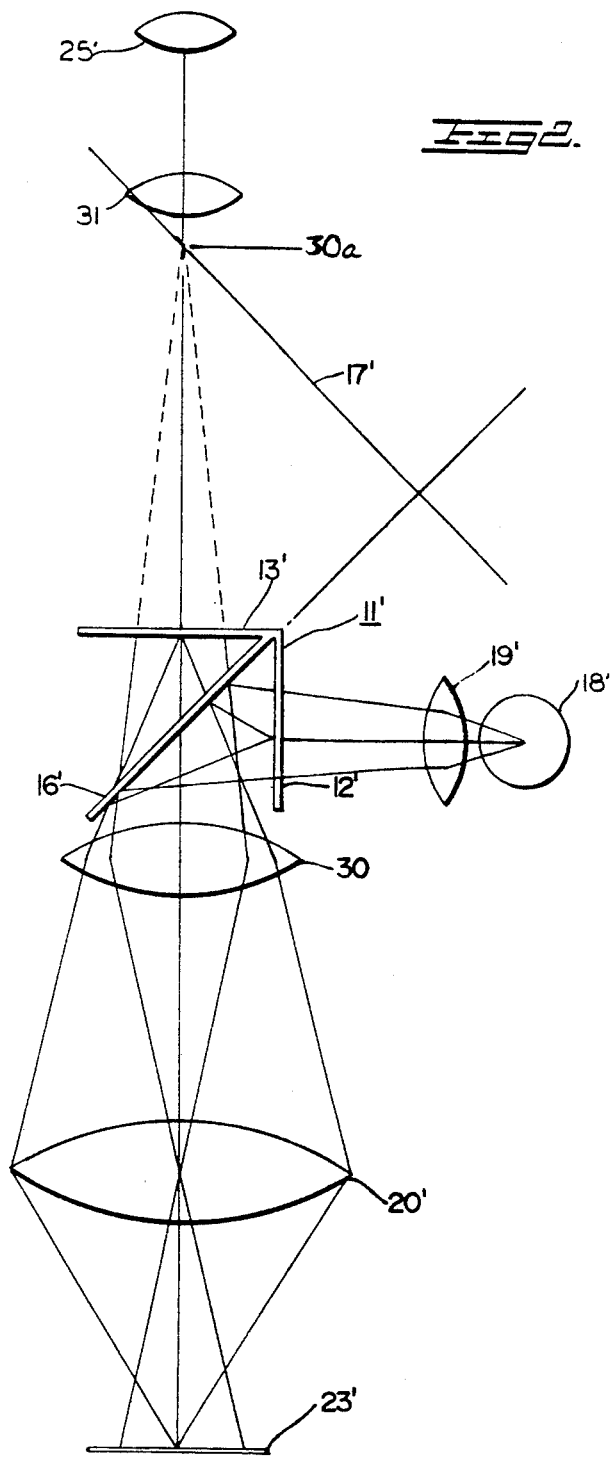

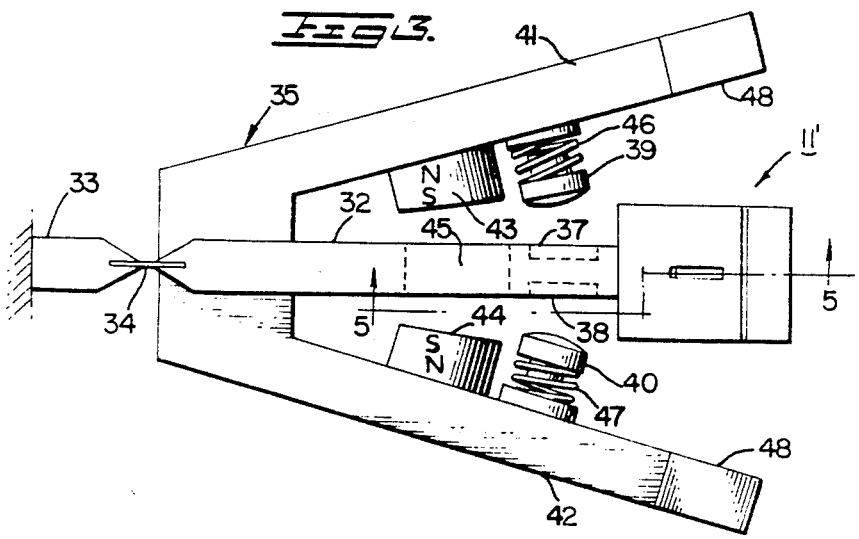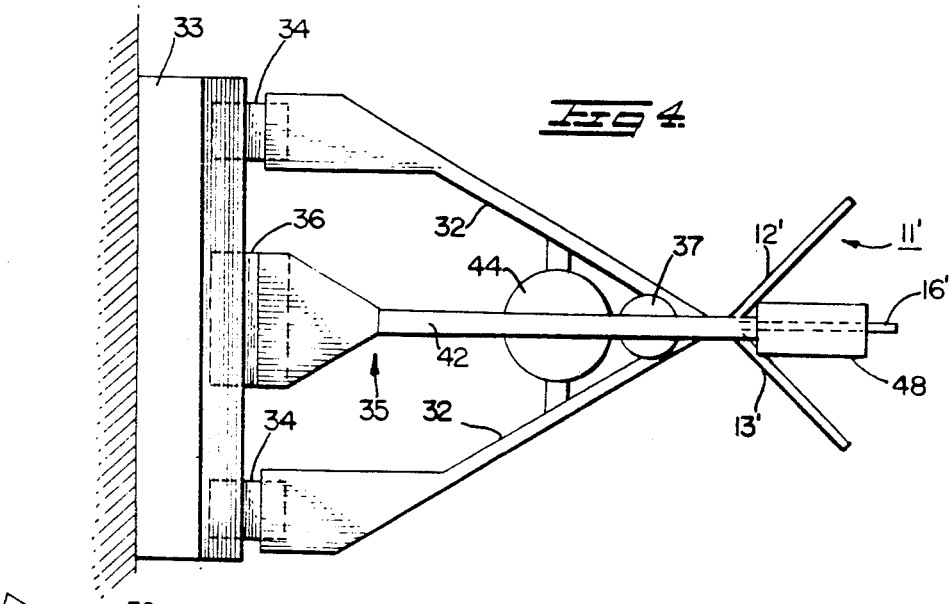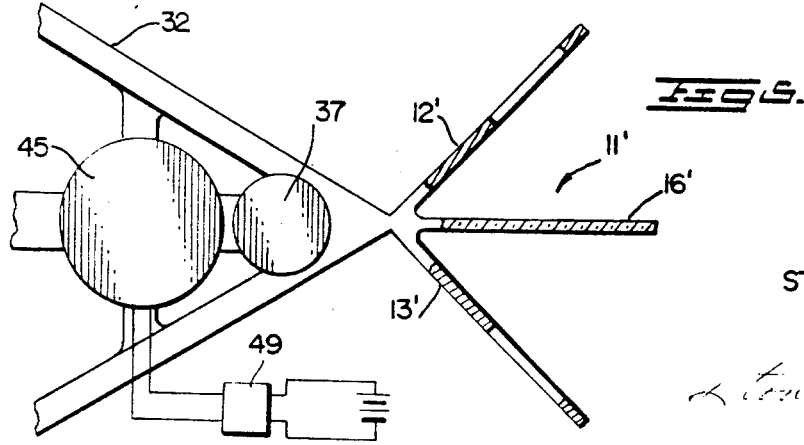

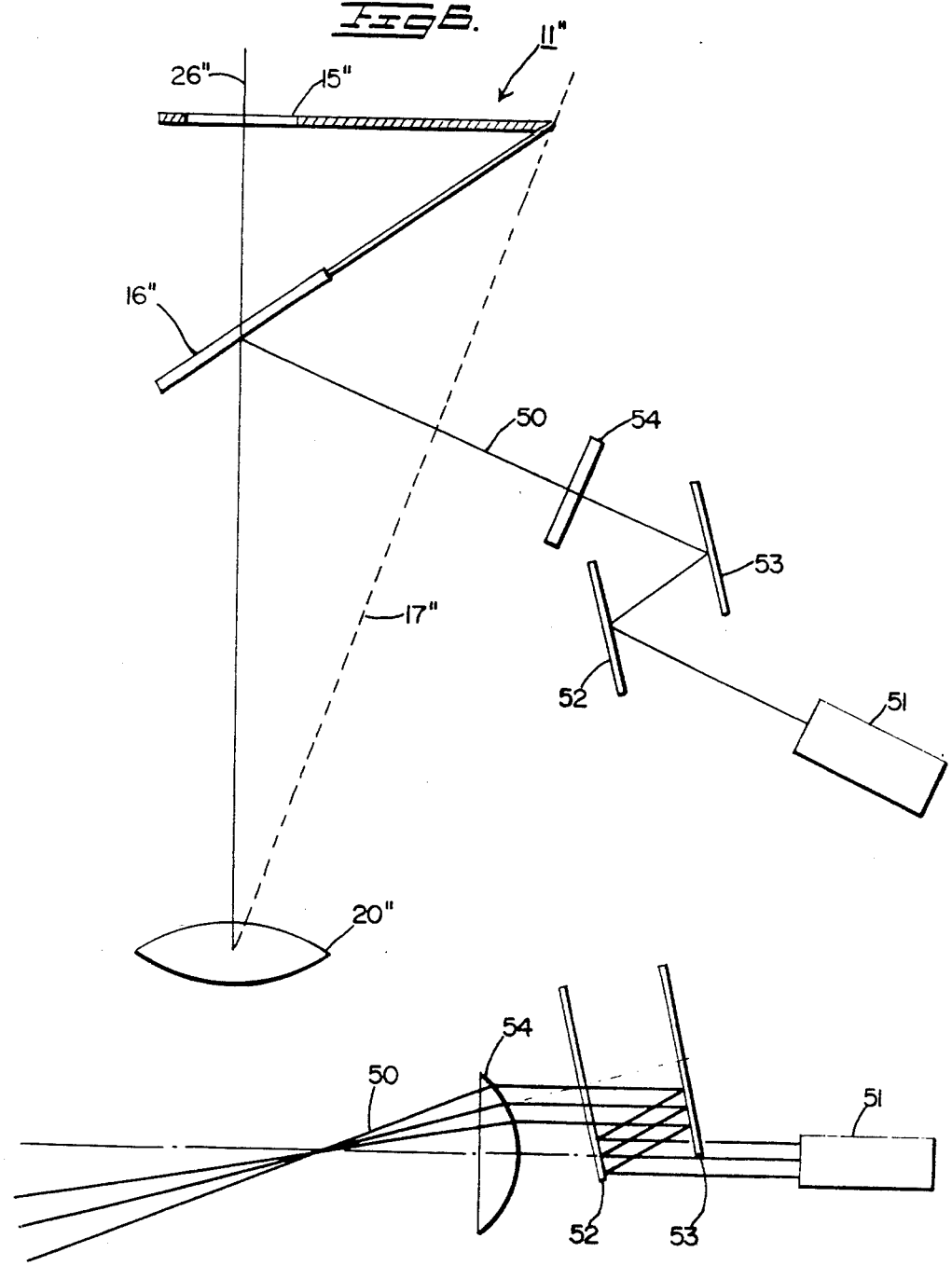

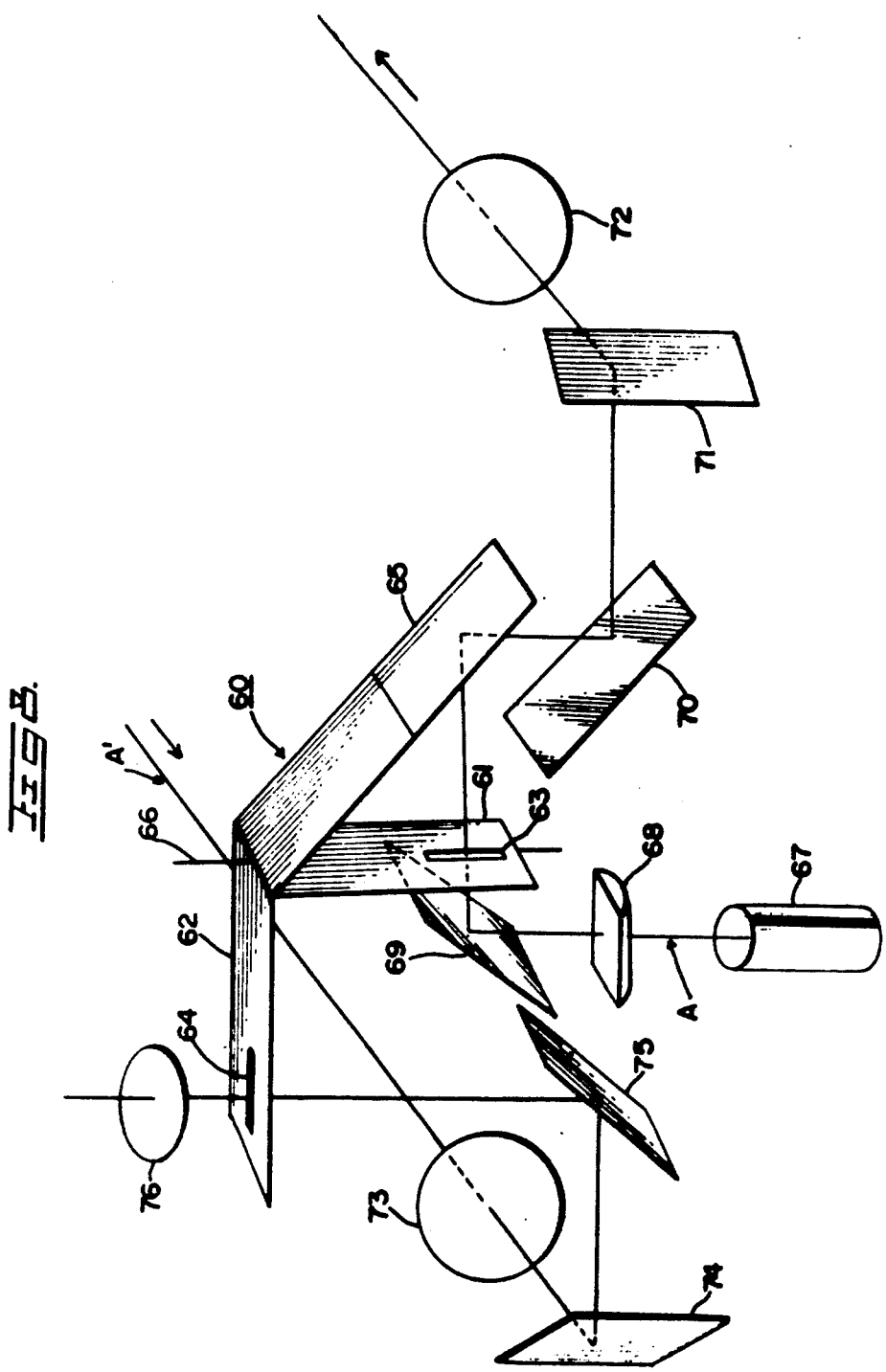

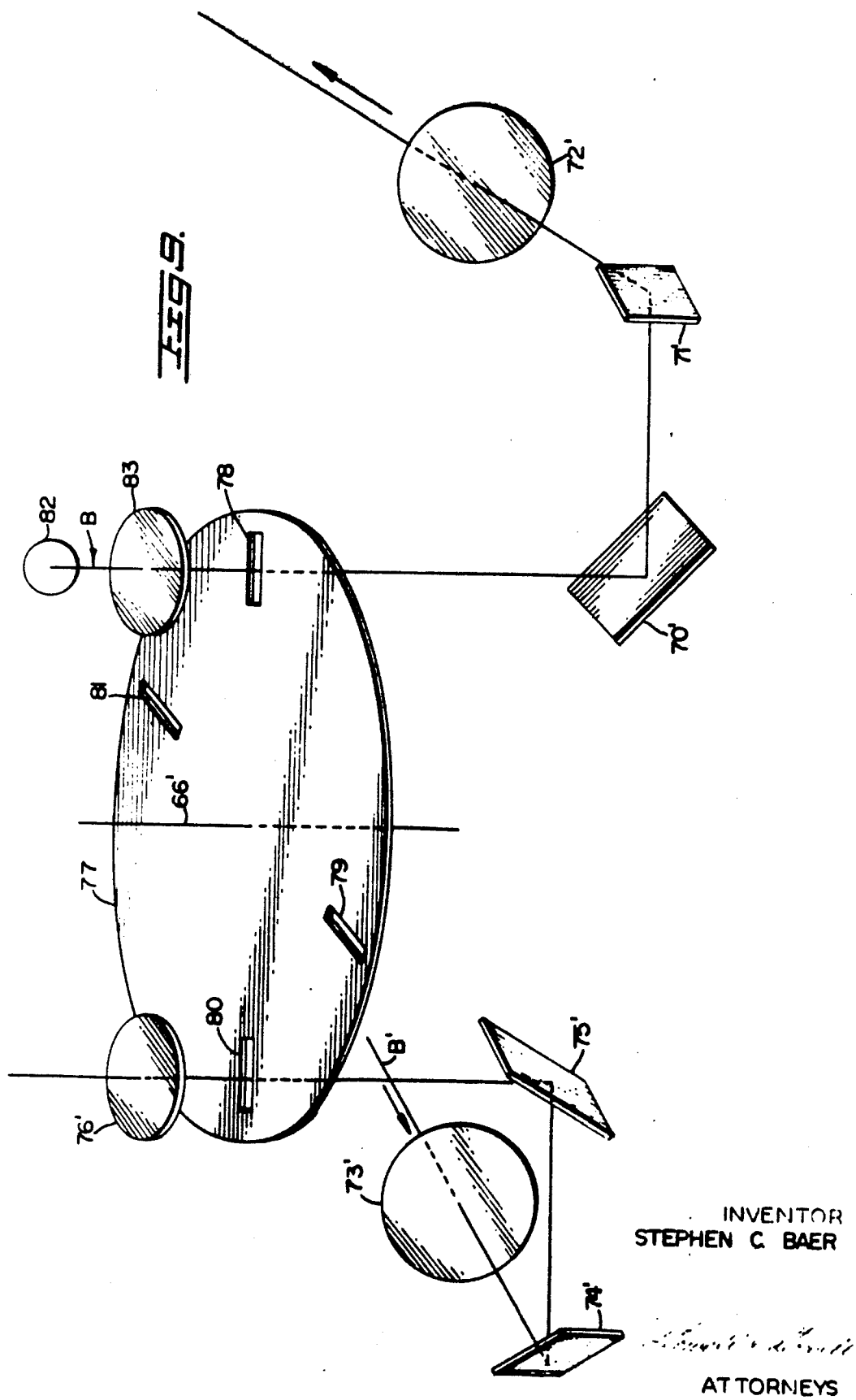

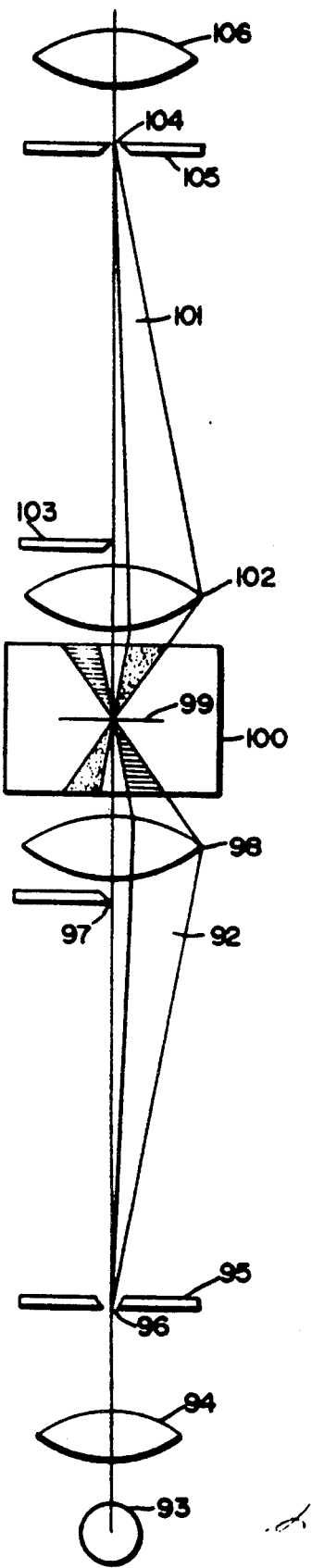

United States Patent Office 3,547,512
Patented Dec. 15, 1970

3,547,512
OPTICAL APPARATUS PROVIDING FOCAL-PLANE-SPECIFIC ILLUMINATION
Stephen C. Baer, Bronx, N.Y., assignor to Research Corporation, New York, N.Y., a non-profit corporation of New York
Filed Apr. 16, 1968, Ser. No. 721,848
Int. Cl. G02b *17/00, 21/06*
U.S. Cl. 350—6                   11 Claims

ABSTRACT OF THE DISCLOSURE

Images of areas of selected planes of an object or a field to be viewed are provided by apparatus including means for focusing a slit-shaped beam of radiation upon a narrow strip of the selected plane, means directing a slit-shaped beam of the radiation emanating from the illuminated strip along an axis angularly displaced from the axis of the incident beam upon image forming means, and means synchronously scanning the incident and emanating beams across the selected plane in a direction transverse to the long dimension of the illuminated strip.

---

The invention relates to optical apparatus providing focal-plane-specific (FPS) illumination. As used herein "FPS illumination" designates an arrangement by which radiation emanating only from an in-focus illuminated area is transmitted to an image receptor (e.g., the eye or a camera), radiation from out-of-focus points or areas being selectively masked.

More particularly, the apparatus of the invention provides for the focusing of a beam of radiation upon a narrow strip of a selected plane of the object or field to be viewed, the transmission of radiation reflected, scattered, emitted or otherwise emanating from the illuminated strip upon image forming means through an optical path angularly displaced from the optical path of the illuminating radiation and synchronously scanning the illuminated strip and the radiation therefrom across the selected plane transversely to the long dimension of the strip.

The term "radiation" broadly includes any form of radiation which can be used to provide a viewable or a reproducible image, such as visible and invisible electromagnetic radiation, beams of charged particles such as electrons, and ultrasonic radiation.

The present invention permits epiillumination or reflected light microscopy of translucent materials which are difficult to obtain thin enough for transillumination microscopy and are unsuitable for existing epiillumination techniques wherein light diffusely reflected from out-of-focus layers forms a bright, hazy background of insufficient contrast with detail in the plane of focus. Such materials include not only many papers, fabrics, ceramics, minerals, plastics and the like but also biological tissues including living tissues. With a prototype microscope embodying the principles of the invention it has been found possible to see with high clarity, at magnifications up to 1000× and at subsurface depths up to 50 microns, cellular detail in functioning kidneys, livers, brains and other internal organs of living animals. At depths of 100 microns some structure is still visible, and with transparent tissue such as the eye the depth of penetration is limited only by the working distance of the objective. Structures such as cell boundaries, nuclei, nucleoli, cytoplasmic granules, cilia, nerve fibers, muscle striations and the like are visible by virtue of reflectivity differences from their surroundings. Non-toxic fluorescent dyes may be added to differentially stain selected structures. The fluorescence image thus obtainable is equal in resolution and contrast to a conventional fluorescence image obtained with very thin specimens.

The principles of the invention will be more particularly discussed with reference to the accompanying drawings in which:

FIG. 2 is a diagrammatic elevational view of another form of microscope including an alternative arrangement of the scanning assembly;

FIG. 3 is a plan view;

FIG. 4 is a side elevation; and

FIG. 5 is a fragmentary enlarged view in partial section on line 5—5 of FIG. 3 of mechanism suitable for actuating the scanning assemblies of the microscopes shown in FIGS. 1 and 2;

FIG. 6 is a diagrammatic plan view; and

FIG. 7 is a partial lateral view of a further form of microscope embodying the principles of the invention; and FIG. 8 is a diagrammatic perspective view of a telescope embodying the principles of the invention.

FIG. 9 is a diagrammatic perspective view of another form of telescope embodying the principles of the invention.

FIG. 10 is a diagrammatic elevational view of another form of microscope embodying the principles of the invention.

Figure 1:
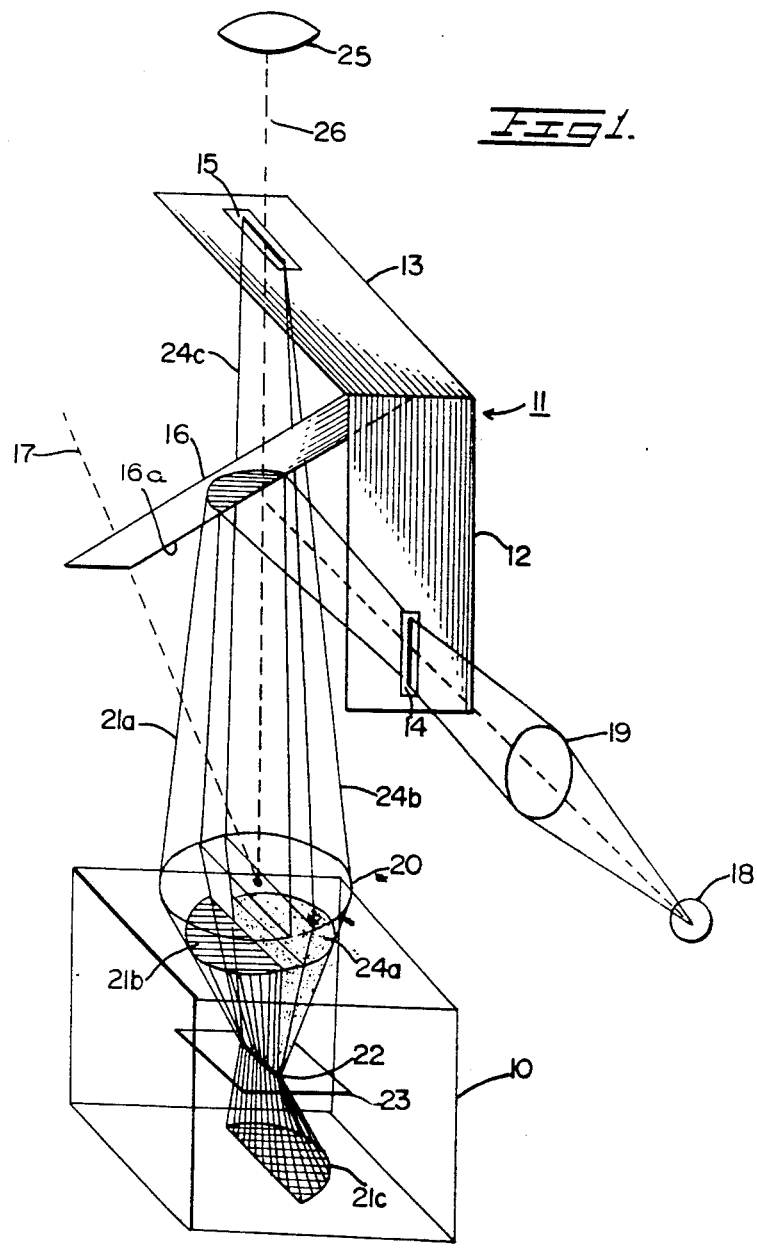
FIG. 1 is a diagrammatic perspective view of a microscope embodying the principles of the invention.

In FIG. 1, 10 indicates a specimen to be examined and 11 is a mirror-slit assembly consisting of othogonal slit diaphragms 12 and 13 pierced by narrow slits 14, 15 respectively, and of mirror 16 positioned midway between diaphragms 12 and 13 with edge 16a of the mirror coplanar with slits 14 and 15. Mirror 16 is aligned so that the mirror image of slit 14 coincides with slit 15. The mirror-slit assembly is mounted for oscillation about axis 17 which lies in the same plane with slits 14 and 15. The axis 17 is normal to the surface of the mirror and at an angle of 45° to the beam reflected therefrom and, in the form of the invention shown in FIG. 1, passes through the optical center of the aperture of objective 20. In other forms of the invention, the axis of rotation passes through a point slightly displaced from the optical center of the objective, in order to secure improved resolution in the scanned dimension.

Radiation from a source 18, which may be a conventional incandescent light, is directed by lens 19 through slit 14 upon mirror 16 along an axis normal to the slit and at a 45° angle to the mirror. The reflected beam of radiation 21a, b, c from mirror 16 is focused by conventional objective lens 20 upon a narrow strip 22 of the selected plane 23 of specimen 10. The beam 24a, b, c of radiation reflected from strip 22 is directed by lens 20 through slit 15 to eyepiece 25.

In FIG. 1 the mirror-slit assembly is shown in its midpoint position with slit 15 intersecting the principal axis 26 and lying in the real image plane. As the mirror-slit assembly oscillates about axis 17 through a small angle away from this midposition, slit 15 traces a conical surface which closely approximates the real image plane.

The radiation from source 18, as restricted by slit 14 and mirror 16, illuminates only a small volume of the specimen as indicated at 21b and 21c. For a point in the specimen to be visible to the eyes or camera, not only must it be illuminated but it must also be viewable through slit 15. The volume of points so viewable is indicated by the stippled ray volume 24a and its projection below plane 23. It will be seen that the volume of points viewable through slit 15 is completely disjoint from the volume of illuminated points except at the strip 22 which is the conjugate image of both slits 14 and 15. Because of the finite widths of slits 14, 15 and because of the resolution limits of the objective, simultaneously illuminated and viewable points actually occupy a small volume along strip 22. However, by choosing sufficiently narrow slit widths, this volume can be restricted to include only in-focus points.

The region of simultaneously illuminated and viewed points is broadened across the focal plane 23 by oscillation of the mirror-slit assembly about axis 17 so that slit 15 passes across the real image plane of beam 24 from one side to the other and, correspondingly, strip 22 passes across the focal plane 23 in the specimen. Unlike images resulting from scanning in two dimensions, the resulting image is inherently free of scanning lines. A single scan suffices for photomicrography. For direct viewing the scanning must be repetitive at a frequency high enough to eliminate flicker. Because of the disposition of the axis of rotation of the mirror-slit assembly, at every position of the assembly the plane in which the slits 14, 15 and the edge of mirror 16 lie always passes through the same point in the aperture plane of objective 20, so the proportions of the aperture traversed by the beam incident upon the specimen and the beam reflected from the specimen are independent of position of the assembly. Furthermore, since the plane of mirror 16 does not change with rotation of the mirror-slit assembly 11, if at any position of the mirror-slit assembly the light source is aligned to provide maximum concentration of light on the specimen, the light source will remain in optimal alignment for every other position as well.

In the form of the invention shown in FIG. 2, in which members corresponding to those of FIG. 1 are given corresponding primed reference numerals, a positive lens 30 is placed between the objective 20' and the real image plane to reduce the size of that image. In this arrangement, the positive lens 30 forms an image 30a of the center of the optical aperture of the objective and it is through that image rather than through the aperture of the objective that the axis of rotation 17' of the mirror-slit assembly passes. The positive lens may also be used to correct residual lateral chromatic aberration of the objective. In non-fluorescent applications such correction may be made in the eyepiece, after the mirror-slit assembly, but for fluorescence microscopy the correction should be made between the objective and the assembly. The real image, which had been reduced in size by lens 30, is remagnified to its original size by relay lens 31. Relay lens 31 also increases the distance of clearance beneath the eyepiece, allowing use of a standard binocular or trinocular microscope head. In FIG. 2, lens 30, the mirror-slit assembly and its oscillating mechanism, and lens 31 could be manufactured as a unit which by insertion between the body and removable head of a standard laboratory microscope, would convert that microscope into a microscope of the present invention.

In a prototype microscope embodying the arrangement shown in FIG. 2, objective 20' is a 40-power oil-immersion fluorite lens with a numerical aperture of 1.00, lens 30 is a five centimeter focal length achromat, lens 31 is a 50 mm. $f/3.5$ Tessar, and lens 25' is a wide field compensated 10-power eyepiece. Light source 18' is a DC energized 200-watt mercury arc lamp. DC energization is desirable as it eliminates the need to synchronize the oscillations of the mirror-slit assembly with the frequency of an AC current. The slits of diaphragms 12', 13' are 1 centimeter in length and 10 microns in width. When light must be restricted as closely as possible to the plane of focus the slit width should be the resolution distance of the objective multiplied by the magnification of the real image. In cases when brighter illumination is desired and some spillage of light to out-of-focus regions is tolerable, the slits may be wider. The slits do not have to be rectangular. For example, they may be wedge shaped and longer than the unscanned dimension of the real image, so that by choice of the region of the slit placed in the field of view, the effective width of the slit may be made wide or narrow to suit the application. The width of such an adjustable slit could also vary in steps.

Mechanism for oscillating the mirror-slit assembly 11' of the microscope of FIG. 2 about axis 17' without transmitting vibration to the other elements of the microscope is shown in FIGS. 3, 4 and 5, wherein members shown in FIG. 2 are designated by like numerals.

The mirror-slit assembly 11' is mounted on arm 32 which is pivotally connected to support 33 by leaf spring members 34. The counterbalance 35 pivots on leaf spring member 36 coaxially with assembly 11'. Electrical contacts 37, 38 are mounted on arm 32 and contacts 39, 40 are spring mounted on arms 41, 42, respectively.

Permanent magnets 43, 44, which are polarized as shown, are also mounted on arms 41, 42 respectively and electromagnet 45 is mounted on arm 32. Contact of 38 and 40 triggers an electronic bistable multivibrator circuit 49 to the "on" state allowing current to flow through electromagnet 45 producing repulsion between 45 and 44 and attraction between 45 and 43. The magnetic forces cause mirror-slit assembly 11' to rotate until contacts 37 and 39 come together triggering the bistable multivibrator to "off," interrupting current flow in coil 45, whereupon the mechanical energy stored in spring 46 urges the mirror-slit assembly and the counterbalance 35 to recoil until contacts 38 and 40 collide thereby repeating the process. The point of collision of the contact pairs is selected wtih respect to the mass distribution of the oscillating members to minimize the impulse transmitted to support 33 upon each collision. Dead weights 48 on the arms of counterbalance assembly 35 provide for adjustment of the mass distribution of the counterbalance.

When very high scanning rates are required, two or more identical mirror-slit assemblies may be mounted radially about a common axis of rotation, and the resulting superassembly rotated continuously at high speeds.

A way of producing "scanning" with no mechanical movement, involves placing a prism or diffraction grating between the objective and a stationary mirror-slit assembly, so that in the plane of focus of the specimen, the conjugate image of the slits is chromatically dispersed to extend over the entire field of view, with the red conjugate image of the slits at one side of the field, and the blue conjugate image at the opposite side. Incident rays of each given wavelength converge in the specimen onto a strip which is FPS illuminated by light of that wavelength. If the light source produces a continuous spectrum, then every point in the field of view is FPS illuminated by light of one wavelength. A second prism or grating between the mirror-slit assembly and the eyepiece produces for the eye or camera, a chromatically dispersed image of slit 15 which corresponds, point for point, with an ordinary real image of the plane of focus.

Microscopes and other apparatus embodying the principles of the invention may be adjusted so that the incident and reflected beams intersect below the plane of focus, rather than in that plane as is required for FPS illumination. The adjustment may be by an appropriate small translation of either of the slits, in FIG. 1, for example, by movement of slit 14 a short distance to the right. When the incident and reflected beams intersect below the plane of focus, out-of-focus objects in the region of intersection provide a bright, diffuse background, upon which light absorbing objects in the plane of focus appear dark. Such illumination might be called "sub-focal-plane-specific" illumination. Reflected light microscopes offering such illumination would combine optical properties of transmitted light microscopy with the advantage of requiring access to only one side of the specimen.

The microscopes of the invention provide substantial advantages when used for surface microscopy. For the same reason that light reflected from out-of-focus layers of the specimen is rejected, incident rays back-reflected from objective lens elements are also rejected, markedly improving image contrast over that obtained with conventional through-the-lens epiillumination techniques. By utilizing depth-of-field enhancement as described below the microscopes of the invention can produce a field as flat as the specimen regardless of the field curvature of the objective. Since the microscopes of the invention utilize only light reflected from that portion of the specimen which is sharply in focus they can reveal with high contrast minute differences in surface elevation.

By virtue of providing FPS illumination at high magnifications, microscopes of the present invention allow high depth-of-field light microscopy at high magnification. D. McLachlan (Applied Optics 3: 1009, 1964) has shown that depth of field in a photomicrograph may be enormously extended by providing the specimen with FPS illumination, and then superimposing on a single photographic plate, multiple exposures of the specimen at many closely spaced focus settings. Although theoretically applicable at all magnifications, this method has had a practical upper limit of 200× to 400× because of the problems inherent in illumination from the side of the specimen. The present invention allows the method to be employed at highest light microscope magnifications.

When an objective manifesting longitudinal chromatic aberration is used in microscopes of the invention, planes at varying depths of the specimen are each FPS illuminated with light, the color of which varies with the depth, thus a plane deep in the specimen may be specifically illuminated with red rays, and a more superficial plane specifically illuminated by blue rays. The situation of FPS illumination at many cosely spaced depths, required in the McLachlan technique for high depth-of-field microscopy is therefore achieved without the need to mechanically change the focus of the specimen. The composite image produced at the real image plane of the microscope may be viewed with a stereoscopic illusion of parallax if chromatically dispersing prisms are inserted between that image and the two eyepieces so that for the right eye, the red image is displaced to the right of the blue image, and for the left eye, the red image is displaced to the left of the blue image.

The present invention is applicable to fluorescence and dark-field microscopy since it eliminates out-of-focus points, which with dark-field techniques are much more prominent and objectionable than with bright-field techniques. Therefore, specimens whose thickness prohibits conventional fluorescence or dark-field microscopy may be examined with excellent contrast and resolution. The reflected light image iwth the microscopes of the invention is "dark-field" because detail stands out bright against a dark background. Furthermore, the same general class of structures revealed by conventional dark-field microscopy is also revealed with the microscopes of the invention.

The simplest way to measure the depth between two planes of a microscopic specimen is to measure the distance which the objective or specimen stage moves as the focus is changed from one of these planes to the other. This method requires precise focusing, which is impossible if the surface is very smooth and free of detail. With the microscopes of the invention when a surface enters the plane of focus, it suddenly becomes illuminated, so that even surfaces free of all detail may be precisely placed in the plane of focus. In this way, the microscope allows the depth between smooth surfaces to be measured with a degree of precision formerly requiring more elaborate techniques.

Another application of the invention to depth measurement is in the production of iso-elevation contour maps of complex surfaces. Such a map results if separate exposures of the specimen, at focus settings corresponding to the desired contour depths, are superimposed on a single photographic plate.

A further application of the microscopes of the invention to depth measurement is in production of photomicrographs in which the specimen appears rotated so that different depths of the specimen are transformed to lateral distances on the photomicrograph. Such a photomicrograph results when the mirror-slit assembly is kept stationary and, while the specimen is continuously moved towards or away from the objective, the photographic plate is continuously moved laterally.

All the above applications of the invention which have been described with reference to microscopy, are also applicable in optical systems in which the magnification is less than unity.

FIGS. 6 and 7 diagrammatically illustrate a form of the invention in which the illuminating slit-shaped beam 50 is provided by a source of highly collimated light. such as laser 51, a pair of parallel mirrors 52, 53 positioned angularly with respect to the laser beam and a plano-cylindrical lens 54.

Mirrors 52 and 53 are rigidly attached to the mirror-slit assembly 11 and so rotate in synchronism with it about axis 17″ which passes longitudinally through the slit-shaped focus of beam 50 and through the center of objective lens 20″. Mirrors 52 and 53 laterally deflect the laser beam without altering its direction so that as the mirror-slit rotates, the focus of beam 50 is stationary in space, and beam 50 rotates so as to bear a constant relationship to the mirror-slit assembly. Since the plano-cylindrical lens 54 focuses beam 50 into a slit-shaped focus, there is no need for a slit diaphragm analogous to slit 14 in FIG. 1. The mirror 16″ is positioned to make the mirror image of the focus of beam 15 coincide with slit 15″. After reflection from mirror 16″, the path of the rays is the same as in the microscopes of FIGS. 1 and 2.

In the telescope arrangement shown in FIG. 8 a mirror-slit assembly 60 consists of orthogonal slit diaphragms 61, 62 carrying slits 63, 64 and mirror 65, and is mounted for oscillation about axis 66, which passes through slit 63. Mirror 65 is positioned so that with respect to axis 66, the mirror image of slit 63 is diametrically opposite slit 64. A beam of highly collimated light A originating from source 67, which may be a laser, is focused by plano-cylindrical lens 68, and reflected through a right angle by mirror 69, so it converges to a slit focus coinciding with slit 63, and beam A is thence reflected through successive light angles by mirrors 65, 70 and 71 and finally focused by objective 72 onto a narrow strip in the focal plane in the field to be examined or the distance of which is to be determined. The beam A′, reflected from the illuminated strip in the field focal plane is directed by objective 73, by way of orthogonal reflections from mirrors 74 and 75, through slit 64 to eyepiece 76 of the telescope. As in the other embodiments of the invention, the projected beam A and the reflected beam A′ intersect only at the narrow illuminated strip in the focal plane, producing FPS illumination.

Oscillation of the mirror-slit assembly about axis 66 causes the coincidence strip of the projected and reflected beams to synchronously scan across the focal plane. Because the illumination is FPS, the image of the focal plane is substantially free of interfering light back-reflected from haze, fog, or other light scattering particles between the telescope and the object. The telescope might allow visual observation through turbid water. Because the angular parallax between beams A and A′ varies with the distance between the telescope and the focal plane, these beams can be made to coincide at the focal plane at different distances only by providing parallax compensating means such as cams to move objectives 72 and 73 closer to each other as the object distances decreases.

The telescope shown in FIG. 8 may be combined with presently known optical range-gating means for focal plane specific illumination, in which following a brief pulse of light from a triggerable light source, an ultrafast responding electro-optical light shutter is momentarily opened at a precise delay interval equal to the time for light to travel from the source to the object and then back to the shutter. Referring to the telescope shown in FIG. 8, such a combination could be effected by making light source 67 a high frequency, repetitively acting, short pulse laser, and by inserting a suitably synchronized electro-optical light shutter in the path of bear A'. The combination of telescopes of the present invention with optical range-gating means would produce considerably more selective FPS illumination than either method alone.

In the telescope embodiment of the invention shown in FIG. 9, in which members corresponding to those in FIG. 8 are given corresponding primed reference numerals, disc diaphragm 77 contains radial slits 78, 79, 80, and 81 symmetrically aligned along two perpendicular diameters. Beam B originates from light source 82, is directed by lens 83 through slit 78, and onto mirror 70', and thence is reflected and focused as in FIG. 8 upon a narrow strip in the focal plane. Beam B' follows the same path as beam A' of FIG. 8, and is restricted by slit 80, corresponding to slit 64 of FIG. 8.

Rotation of disc diaphragm 77 about axis 66' causes the projected beam B and the reflected beam B' to synchronously and repetitively scan across the focal plane, first with the beam B limited by slit 78 and beam B' limited by slit 80, then with beam B limited by slit 81 and beam B' limited by slit 79, then with beam B limited by slit 80 and beam B' limited by slit 78 and so on.

Diaphragm 77 could contain any even number of slits, provided they are widely enough spaced so that at no time is there more than one slit in the field of view. If two or more slits are concurrently in the field of view, then intersection of an illuminating beam with a reflected beam out of the plane of focus is unavoidable, thus precluding FPS illumination.

In the microscope embodiment of the invention shown in FIG. 10, an illuminating slit-shaped beam 92 originates from light source 93, is directed by lens 94 onto diaphragm 95 containing slit 96, passes through slit 96, is limited by knife edge aperture 97, and is thence focused by objective lens 98 onto a narrow strip in the plane of focus 99 of the specimen 100. Slit-shaped beam 101 which emanates as scattered radiation from the illuminated strip in plane 99 is focused by objective lens 102, is limited by knife edge aperture 103, passes through slit 104 in diaphragm 105, and reaches eyepiece 106. Knife edge aperture 97, the edge of which intersects the axis of objective 98 and is parallel to slit 96, limits the illuminated region of the specimen and knife edge aperture 103, placed similarly with respect to objective 102 and slit 104, limits the viewable region of the specimen, so that these two regions are allowed to intersect only at a narrow strip in the plane of focus 99, producing FPS illumination as in other embodiments of the invention. Simultaneous scanning of the two beams across the plane of focus of the specimen is produced by simultaneous translation of diaphragms 95 and 105 across their respective field planes, for example, by translation of a rigid member (not shown) to which both the diaphragms are attached.

In another embodiment of the invention the illuminating slit-shaped beam originates from individual strip segments of a panel of parallel, individually electrically activatable, strip-shaped light sources such as light-emitting diodes, located in the field plane of an illuminating optical system, and scanning of the illuminating beam across the object plane of the specimen is effected by sequential activation of adjacent strips of such a panel. Synchronous scanning of the reflected slit-shaped beam is effected by suitably synchronized activation of conjugately located strip segments of a panel of parallel, individually electrically activatable, strip-shaped light gating means such as solid-state image intensifiers, located in the field plane of the viewing optical system.

I claim:
1. Apparatus for forming an image of a selected plane of an object or field comprising means focusing a slit-shaped beam of radiation on a narrow strip in the selected plane, means directing a slit-shaped beam of radiation emanating from the irradiated strip along an axis angularly displaced from the axis of the incident beam upon image forming means, and means synchronously scanning the incident and emanating beams across said selected plane in a direction transverse to the long dimension of the slit-shaped beam.

2. Apparatus as defined in claim 1 wherein the slit-shaped beam of illuminating radiation is provided by a diaphragm having a slit-shaped aperture positioned transversely to the optical axis of a beam of radiation.

3. Apparatus as defined in claim 1 wherein the source of the slit-shaped beam includes a laser.

4. Apparatus as defined in claim 1 wherein the source of the slit-shaped beam includes a heatable rectilinear filament.

5. Apparatus as defined in claim 1, wherein the source of the slit-shaped beam includes a panel of parallel, individually activatable, slit-shaped sources of radiation, and the means scanning said beam across said selected plane includes means sequentially activating adjacent slit-shaped sources of said panel.

6. Apparatus as defined in claim 1 including a mirror positioned to intercept the slit-shaped beam of illuminating radiation along an edge of the mirror and inclined at an angle to said beam to direct the beam to the object.

7. Apparatus as defined in claim 6 including means pivotally mounting said mirror and said diaphragm for synchronous rotation about an axis coplanar with the optical axes of the incident and reflected beams.

8. Apparatus as defined in claim 7 wherein the axis of rotation of the mirror and diaphragm passes through or near the optical center of the objective lens of the apparatus.

9. Apparatus as defined in claim 7 wherein the axis of rotation of the mirror and diaphragm passes through or near the optical center of the real image formed by the objective lens.

10. Apparatus as defined in claim 1 wherein the means focusing the illuminating radiation on the selected plane and the means focusing the reflected radiation on the image receptor include at least one common lens number.

11. Apparatus as defined in claim 1 including means chromatically dispersing said beam of radiation focused upon the object, so that rays of different wavelengths are focused on different strips on said object.

References Cited
UNITED STATES PATENTS

| Re. 18,537 | 7/1932 | Karodus | 350—6 |
| 2,497,953 | 2/1950 | Maurer | 350—6 |
| 2,537,846 | 1/1951 | Munn | 350—17 |
| 2,957,386 | 10/1960 | Robinson | 350—6 |
| 2,976,362 | 3/1961 | Stamps | 350—6 |
| 3,277,772 | 10/1966 | Atwood | 350—7 |
| 3,305,834 | 2/1967 | Cooper et al. | 350—7 |
| 2,950,648 | 8/1960 | Rhodes | 350—314 |
| 2,023,217 | 12/1935 | Benford | 178—7.6 |
| 2,977,847 | 4/1961 | Arendt | 350—91X |
| 3,398,634 | 8/1968 | McLachlan | 350—91UX |
| 3,460,880 | 8/1969 | Henderson | 350—91X |

PAUL R. GILLIAM, Primary Examiner

U.S. Cl. X.R.

350—87, 91